US007594166B1

(12) United States Patent
Ramakrishna et al.

(10) Patent No.: US 7,594,166 B1
(45) Date of Patent: Sep. 22, 2009

(54) DYNAMIC WEB PAGE BEHAVIORS

(75) Inventors: Anand Ramakrishna, Redmond, WA (US); Christian Fortini, Redmond, WA (US); Alexander J. Zotov, Bellevue, WA (US); Roderick Chavez, Kirkland, WA (US); David H. Massy, Redmond, WA (US); Richard J. Gardner, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/316,897

(22) Filed: May 20, 1999

(51) Int. Cl.
G06F 15/00 (2006.01)
G06F 9/44 (2006.01)
G06F 15/16 (2006.01)

(52) U.S. Cl. .............. 715/234; 715/205; 715/236; 715/760; 717/111; 717/115; 717/120; 709/203; 709/217

(58) Field of Classification Search ............ 707/501.1, 707/525; 345/760, 744; 715/580.1, 514, 715/526, 501.1, 512, 513, 200, 205, 226, 715/234, 238, 253, 255, 273, 760; 709/201, 709/203, 217, 202, 218, 219; 717/100, 106–108, 717/114, 115, 116, 110, 111, 120; 705/200–202, 705/205, 209, 226, 234, 236, 238, 243, 253, 705/255, 256, 273, 749, 760, 793
See application file for complete search history.

(56) References Cited

U.S. PATENT DOCUMENTS 5,594,660 A * 1/1997 Sung et al. ............... 707/500.1
5,680,619 A * 10/1997 Gudmundson et al. ...... 717/108
5,761,684 A * 6/1998 Gibson ..................... 715/515
5,802,299 A * 9/1998 Logan et al. ............... 709/218
5,860,073 A * 1/1999 Ferrel et al. ............... 715/522
5,894,554 A * 4/1999 Lowery et al. ............ 709/203
5,905,492 A * 5/1999 Straub et al. ............. 345/744
5,907,704 A * 5/1999 Gudmundson et al. ..... 717/100
5,973,696 A * 10/1999 Agranat et al. ........... 709/203

(Continued)

FOREIGN PATENT DOCUMENTS

EP 0818742 A1 * 1/1998
GB 2329309 A * 7/1998

OTHER PUBLICATIONS

Charlie Kindel, "COM: What Makes it Work, Black-Box Encapsulation through Multiple, Immutable Interfaces", IEEE, 1997, pp. 68-77.*

(Continued)

*Primary Examiner*—Laurie Ries
*Assistant Examiner*—MaiKhanh Nguyen

(57) ABSTRACT

A method and system for rendering dynamic web page images on a display is disclosed. Code is encapsulated in an external behavior component for affecting the behavior of elements inserted into an HTML document. A simple reference is attached to the element in the document to associate the element with the external behavior component. When the document is provided to a renderer and the renderer parses the element in the document, the renderer accesses the external component to modify a behavior of the page image. Multiple documents can reuse external behavior components, and an element can be associated with multiple external behavior components. The associations between elements and external behavior components may be maintained in cascading style sheets, inline with the elements, and in various formats.

43 Claims, 5 Drawing Sheets

U.S. PATENT DOCUMENTS

| | | | | |
|---|---|---|---|---|
| 6,006,242 | A * | 12/1999 | Poole et al. | 715/531 |
| 6,026,433 | A * | 2/2000 | D'Arlach et al. | 709/217 |
| 6,035,119 | A * | 3/2000 | Massena et al. | 717/100 |
| 6,061,698 | A * | 5/2000 | Chadha et al. | 715/207 |
| 6,085,220 | A * | 7/2000 | Courts et al. | 709/201 |
| 6,101,510 | A * | 8/2000 | Stone et al. | 715/513 |
| 6,125,385 | A * | 9/2000 | Wies et al. | 709/203 |
| 6,161,126 | A | 12/2000 | Wies et al. | 709/203 |
| 6,178,432 | B1 * | 1/2001 | Cook et al. | 715/513 |
| 6,188,401 | B1 * | 2/2001 | Peyer | 715/805 |
| 6,230,171 | B1 * | 5/2001 | Pacifici et al. | 715/512 |
| 6,237,010 | B1 * | 5/2001 | Hui et al. | 345/428 |
| 6,249,291 | B1 * | 6/2001 | Popp et al. | 345/473 |
| 6,256,668 | B1 * | 7/2001 | Slivka et al. | 709/220 |
| 6,263,352 | B1 * | 7/2001 | Cohen | 715/206 |
| 6,279,006 | B1 * | 8/2001 | Shigemi et al. | 707/100 |
| 6,286,043 | B1 * | 9/2001 | Cuomo et al. | 709/223 |
| 6,347,398 | B1 * | 2/2002 | Parthasarathy et al. | 717/178 |
| 6,353,850 | B1 * | 3/2002 | Wies et al. | 709/203 |
| 6,397,217 | B1 * | 5/2002 | Melbin | 707/102 |
| 6,397,245 | B1 * | 5/2002 | Johnson et al. | 709/203 |
| 6,401,077 | B1 * | 6/2002 | Godden et al. | 705/26 |
| 6,415,307 | B2 * | 7/2002 | Jones et al. | 707/525 |
| 6,434,578 | B1 * | 8/2002 | McCauley et al. | 715/517 |
| 6,470,349 | B1 * | 10/2002 | Heninger et al. | 707/102 |
| 6,504,554 | B1 * | 1/2003 | Stone et al. | 345/760 |
| 6,546,397 | B1 * | 4/2003 | Rempell | 707/102 |
| 6,585,777 | B1 * | 7/2003 | Ramaley et al. | 715/513 |
| 6,651,108 | B2 * | 11/2003 | Popp et al. | 719/315 |
| 6,751,778 | B1 * | 6/2004 | Broman et al. | 715/517 |
| 6,799,320 | B1 * | 9/2004 | Elvanoglu et al. | 719/331 |
| 6,829,569 | B1 * | 12/2004 | Drucker et al. | 703/6 |
| 6,886,013 | B1 * | 4/2005 | Beranek | 707/10 |
| 2003/0074634 | A1 * | 4/2003 | Emmelmann | 715/513 |

OTHER PUBLICATIONS

Wang et al., "Customization of Distributed Systems Using COM", IEEE Concurrency, Jul.-Sep. 1998, vol. 6, pp. 8-12.*

Jones et al., "Scripting COM components in Haskell", IEEE, Software Reuse—Proceedings Fifth International Conference, Jun. 1998, pp. 1-9.*

E. Pelegri-Llopart et al., "JavaServer Pages Specification," Sun Java Software, A Division of Sun Microsystem, Inc., Nov. 30, 1999, pp. 1-158.*

F. Vitali et al., "Extending HTML in a principled way with displets", Computer Networks and ISDN System, 1997, pp. 1115-1128.*

Microsoft Corporation, "Dynamic HTML: The Next Generation of User Interface Design Using HTML," Feb. 1997, pp. 1-7.*

W. Stanek, "Explore Creativity and Control With Dynamic HTML," Adapted from PC Maganize, Jan. 1998, pp. 1-7.*

B. Burridge, "Browser targeted Cascading Style Sheets using Javascripts," The Complete Webmaster, Jan. 1999, pp. 1-3.*

N. Savio, "What is Dynamic HTML?" Oct. 1997, pp. 1-3.*

Dino Esposito, "Scripting Evolves to a More Powerful Technology—HTML Behaviors in Depth," Apr. 1999, pp. 1-11.*

Dave Massy, Time Off for Good Behavior: DHTML Behaviors in Internet Explorer 5, Mar. 1999, pp. 1-7.*

Lie et al., "Cascading Style Sheets Level 1," W3C Recommendation Dec. 17, 1996, revised Jan. 1999, pp. 1-69.*

Lie et al., "Multipurpose Web Publishing Using HTML, XML, and CSS", Communications of the ACM, vol. 42, Issue 10, Oct. 1999, pp. 95-101.*

Faraday et al, "Authoring Animated Web Pages Using Contact Points", ACM, May 1999, pp. 458-645.*

Gray et al., "Modern Languages and Microsoft's Component Object Model", Communications of the ACM, vol. 41, No. 5, May 1998, pp. 55-65.*

* cited by examiner

DYNAMIC WEB PAGE BEHAVIORS

TECHNICAL FIELD

The invention relates generally to computer systems, and more particularly to the creation and subsequent rendering of interactive web pages on a computer system.

BACKGROUND OF THE INVENTION

Browsers display web pages by interpreting Hypertext Markup Language (HTML), which includes sets of tags nested within other sets of tags around content to render. To assist the authors and designers in creating such web pages, a recent development is the use of cascading style sheets, via which the author or designer may globally specify styles for selected page elements, including appearance information such as color and point sizes of text, page margins, and leading (spacing between lines). A style sheet is essentially a template that controls the formatting of HTML tags on a page, and can be linked to a page or embedded in a page. Style sheets separate the formatting information from the actual content on HTML pages, whereby it has become easier for authors and designers to design and revise pages.

An improvement to how a web page may be made to appear to a viewer is Dynamic HTML (DHTML), which enhances the appearance of a page's elements by adding effects thereto. Dynamic HTML (DHTML) also allows an HTML document to become interactive, which is accomplished by allowing HTML elements or tags within the HTML document to be programmable, such that script can change the content and attributes of the HTML page. For example, a script on the page may allow a list to be expanded or collapsed in response to a mouse click, without needing to retrieve a different HTML document from the server. The script resides on the same page as the other elements, even when the script is obtained from a separate file, since that script is particular to the page and is essentially imported into the page when the HTML document is loaded.

In essence, three job disciplines are involved in creating a DHTML page, i.e., a content provider, designer, and engineer. The content provider is the author of the content of the document, while the designer decides on the look and feel of the document, and typically adds any formatting information. The engineer adds the dynamic functionality using script. In many situations, these jobs are not performed by one highly-skilled person, but by three separate individuals of different skill levels, as many authors and designers are uncomfortable with programming. This, along with the fact that the script resides on the same page as the other elements, makes DHTML expensive and fragile to use in web documents. More particularly, as the engineer applies one or more scripts to every page, the process becomes expensive and error prone, as subsequent content changes by the author or designer may affect the script. At the same time, the engineer may affect the layout or content of the document when adding the script to the page. Even for those authors and designers who are comfortable with programming concepts and with using script to add dynamic functionality to a document, having the script and content in the same file makes the page creation and maintenance processes relatively slow and difficult to manage.

SUMMARY OF THE INVENTION

Briefly, the present invention provides a method and system for adding script-like behavior to an element via a component that is external to the page. An external behavior is created for affecting the behavior of elements inserted into an HTML document by encapsulating code in an external behavior component, preferably a COM (component object model) object. A designer or the like adds simple tags to the document to associate the external behavior component with selected elements, thereby separating script from content. These associations between elements and external behavior components may be maintained in cascading style sheets, inline with the elements, and in various formats.

When the document is provided to a renderer and the renderer parses the element in the document, the renderer accesses the associated external component to modify a behavior of the page image. For example, the properties or location of a displayed element associated with the external behavior component may be changed on an event such as a mouseover event. An external behavior component can provide mask behavior to control the format and type of user data input. Another external behavior component can draw on the image when accessed by the renderer.

Multiple documents can reuse external behavior components, enabling, for example, an entire web site to share a common behavior. An element can be associated with multiple external behavior components to provide multiple effects, such as changing color and expanding a list when clicked by a user.

Other advantages will become apparent from the following detailed description when taken in conjunction with the drawings, in which:

DETAILED DESCRIPTION OF THE PREFERRED EMBODIMENT

Exemplary Operating Environment

Figure 1:
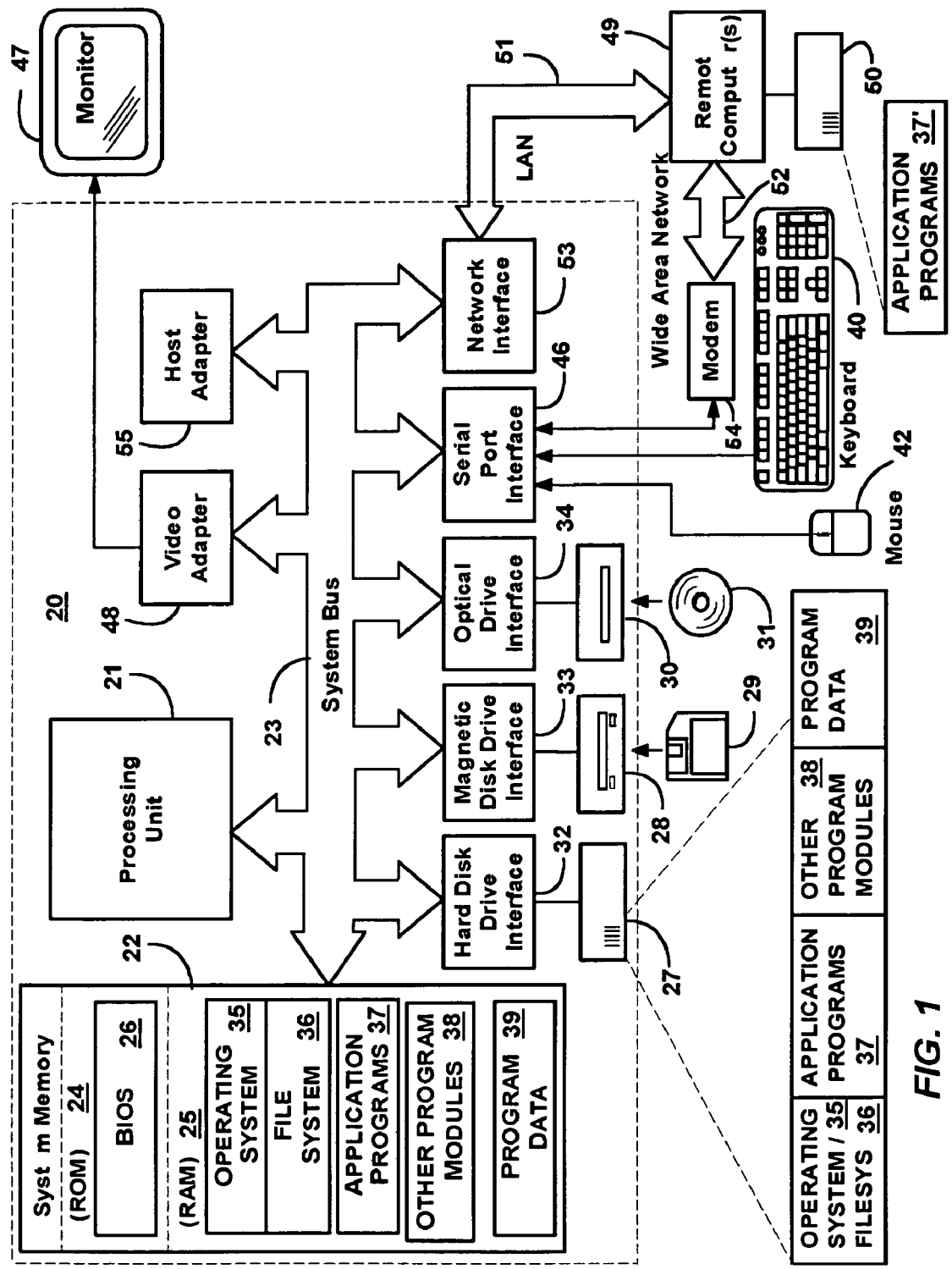
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

DHTML Behaviors

DHTML behaviors (e.g., 60, FIG. 2) are components that encapsulate specific functionality or behavior on a page, but are external to the page. DHTML behavior components are preferably COM objects, although behavior components are typically implemented using script and HTML. The interfaces for DHTML behavior components are few, simple, and robust, as described below.

Figure 2:
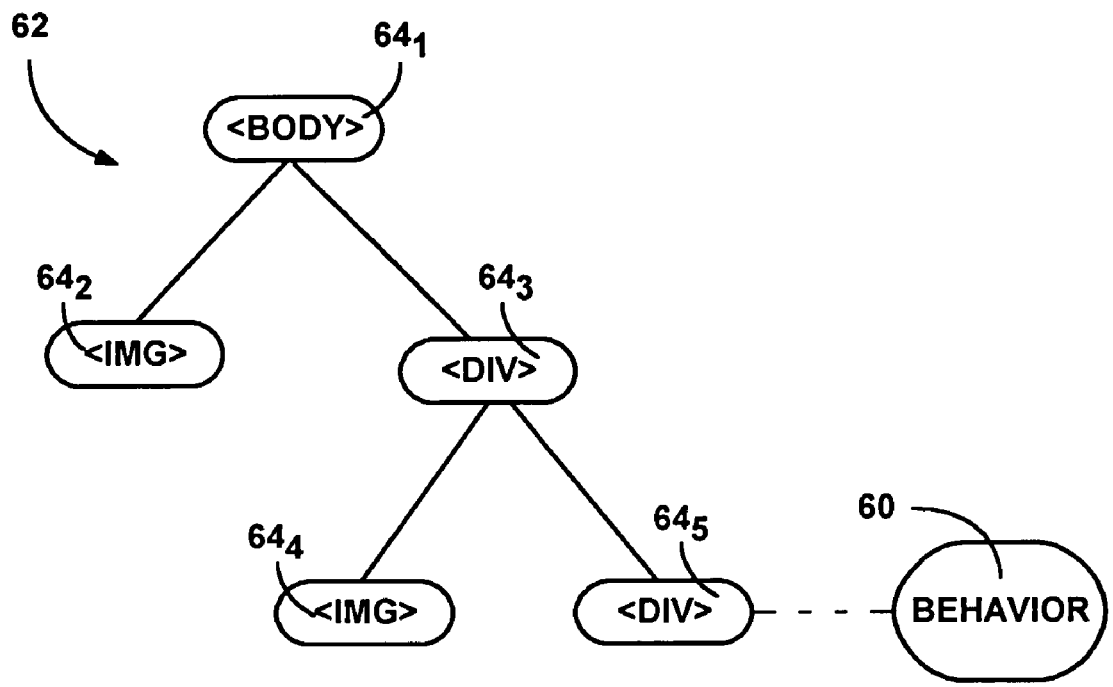
FIG. 2 is a representation of a document tree representing elements hierarchically arranged on a web page and having a behavior attached to an element in accordance with one aspect of the present invention.

In general, an HTML document, or page, may be considered a document tree, in that elements are contained by other elements in a hierarchical manner. As shown in FIG. 2, an exemplary HTML document tree 62 shows elements $64_1$-$64_5$ as nodes of the tree, and a behavior 60 attached to one of the elements $64_5$. Indeed, a renderer (browser) 66 logically constructs such a tree when provided with a page, (e.g., $68_A$ of FIG. 3), whereby attributes and the like may be applied appropriately to elements as events are received, i.e., the events bubble up through the tree as described below.

When applied to a standard HTML element on a page, a behavior component 60 enhances that element's default behavior. For example, a behavior component can be written to toggle the display property of an element's children on a mouse click. When such a behavior component 60 is applied to a standard element on a page, the behavior component 60 enhances the unordered list's default behavior to expand and collapse when clicked. Another behavior component (e.g., 60, of FIG. 3) can incrementally set the position of an element from a start point to an end point on the screen, whereby if such a behavior component 60, is applied to an image element, the otherwise statically positioned image "flies" across the screen.

Figure 3:
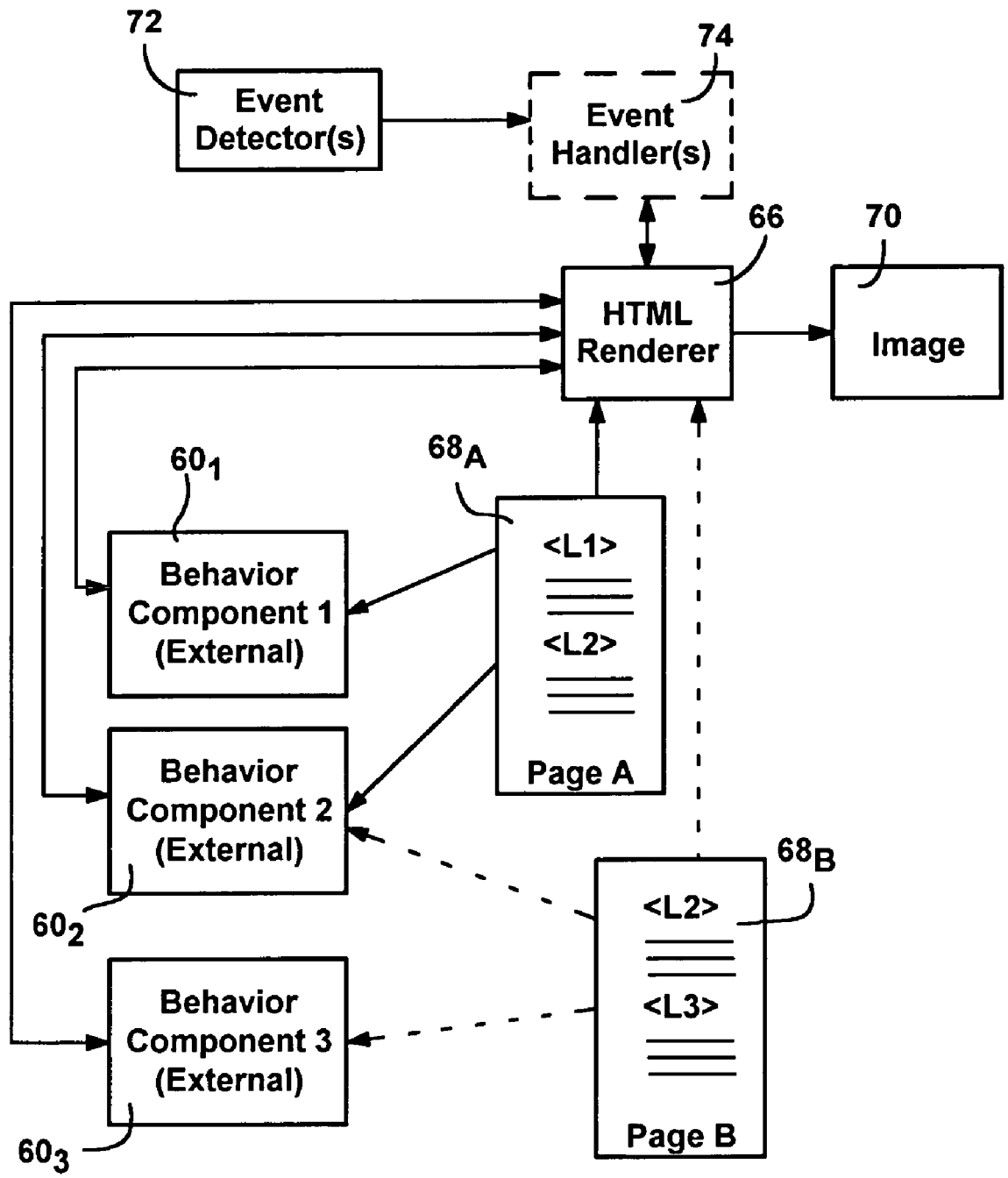
FIG. 3 is a block diagram representing a number of external behavior components and multiple pages that reference those components for use in rendering an image in accordance with one aspect of the present invention.

In accordance with one aspect of the invention and as represented in FIG. 3, behavior components $60_1$-$60_3$ are external components with respect to the pages $68_A$, $68_B$, and thus separate script from content. As a result, improved manageability of pages $68_A$, $68_B$ is provided. Moreover, because the behavior components $60_1$-$60_3$ are encapsulated components, the code of a behavior component may be reused across multiple pages. For example, as represented in FIG. 2, the page $68_A$ includes elements that reference and (when parsed by an HTML renderer 66) use two external behavior components $60_1$ and $60_2$, while the page $68_B$ has elements that also use (another instance) of the behavior component $60_2$ along with the external behavior component $60_3$. The renderer 66 outputs and/or modifies an outputted image based on the attached behaviors. A preferred renderer 66 is Microsoft Corporation's Internet Explorer 5.0 rendering engine (mshtml.dll), which, in addition to being able to handle behavior components, provides data manipulation, formatting, and content changes without dependency on a Web server. With such an engine, enhanced programmatic access and control is provided, the location of objects and images can be precisely specified, and HTML tags, style sheets, text, tables, and ActiveX objects can be handled without requiring interaction with a Web server.

To use a behavior component (e.g., 60, of FIG. 3), an engineer or the like first develops the behavior component 60, using script or a language such as C++ to develop a binary file. More particularly, DHTML behavior components can be written in script using script component technology to provide a safe extensibility mechanism for those that are familiar with script and the Dynamic HTML Object Model. A utility or the like converts the script to a COM object. Behavior components created in C++ use an OBJECT tag syntax (described below) to instantiate, and may be directed to a specific platform, for example, to access Win32 Application Programming Interfaces (APIs) and the interfaces for implementing DHTML behavior components. Note that a number of default behaviors may be developed and, for example, provided with a browser, whether the browser is a stand-alone application or integrated with an operating system, e.g., Internet Explorer.

In accordance with one aspect of the invention, once developed, a page designer or the like may then use the declarative HTML tag syntax that is already familiar to the designer in order to refer to the behavior component. To this end, the designer includes a behavior attribute, essentially a reference to the behavior component, such as in an embedded style in the cascading style sheet block, and also attaches a tag to each element that implements that behavior component. In other words, using existing cascading style sheet support in the renderer 66, a behavior can be added to an element. The behavior property in cascading style sheets typically has the following syntax:

```
Behavior:url( url pointing to behavior component )
```

This syntax can be used in any standard style declaration, for example, in an Inline style declaration on an element, as described below. For example, to add a fly (move across the screen) behavior to a DIV element, a designer enters:

```
<DIV style="behavior:url (fly.htc)" > some text here that
will fly </DIV>
```

As also described below, a class can also be declared to apply to elements in the document. For example, a flyme class may be defined, and can be applied to a DIV element:

```
<STYLE>
        .flyme{behavior:url (fly.htc) }
</STYLE>
...
<DIV class= flyme > this text will fly
</DIV>
```

A new, custom tag may also be defined with a behavior attached, as also described below, for example:

```
<HTML xmlns:fly >
...
<STYLE>
        fly\:flyme{behavior:url (fly.htc) }
</STYLE>
...
<fly:flyme> this text will fly
</fly:flyme>
```

The renderer 66 handles the association between the tag and the behavior component, along with the instantiation of the behavior component and the interfacing thereto, whereby script is no longer needed on the page. The result is dynamic HTML via a substantially cleaner, script-free page.

Figure 4:
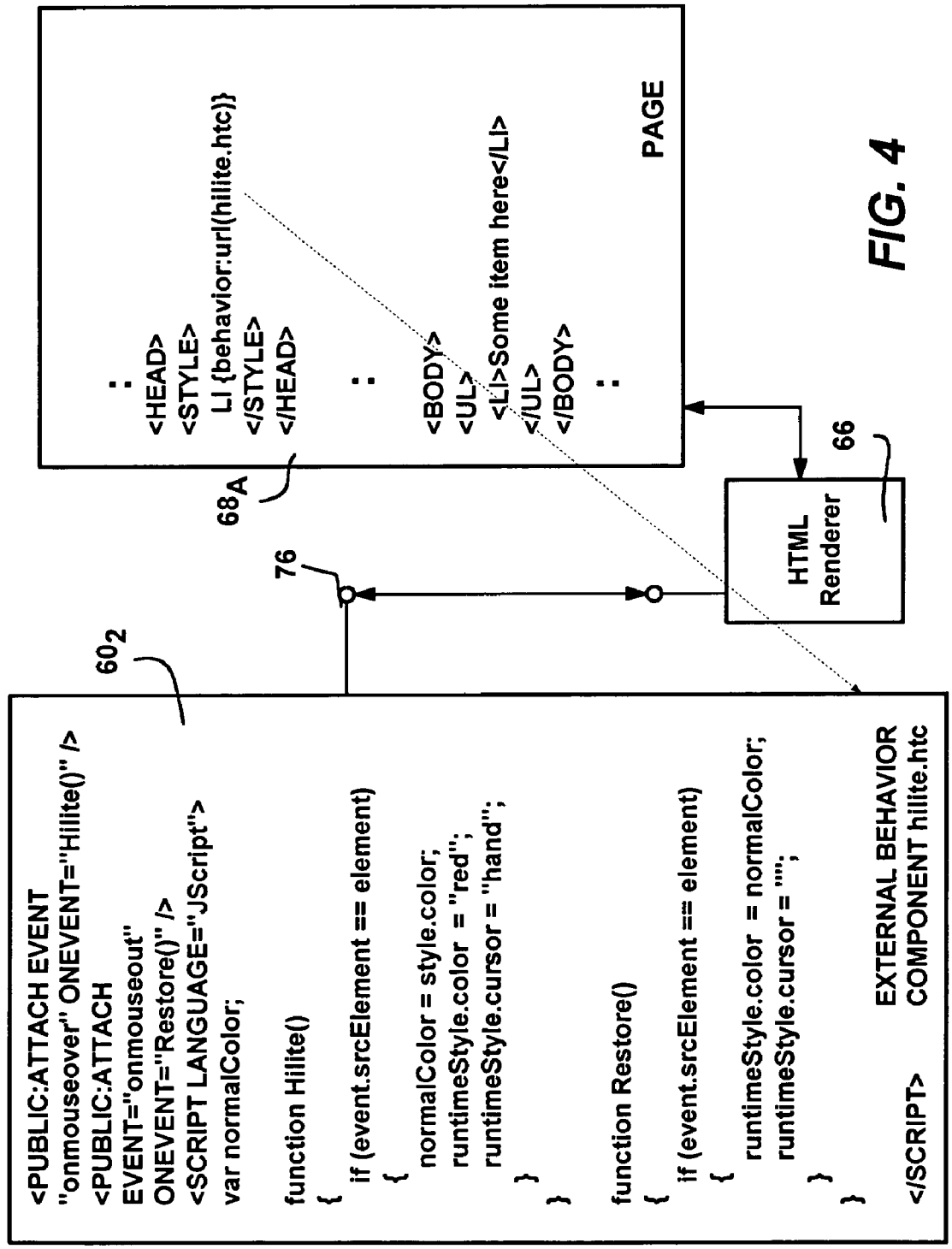
FIG. 4 is a block diagram representing the relationship between style sheets and elements on a page wherein at least one of the elements is associated with an external behavior component in accordance with one aspect of the present invention.

By way of example, as shown in FIG. 4, the behavior component $60_2$ is maintained in a file called hilite.htc, (where HTC stands for HTML Component) and is referenced by the behavior tag <LI> in the cascading style sheet block of the page $68_A$ (as indicated by the <Style> tags). This behavior component $60_2$, shown for purposes of clarity in FIG. 4 as having human-readable script therein, affects the way text appears when the mouse is over that text, i.e., provides mouseover highlights. In other words, this behavior, when applied to an "LI" (list item) element in the body of the page $68_A$, extends the list item's default behavior to change its color when the user moves the mouse over it, and then restore its original color when the mouse is moved off of the item. The page entries are shown in the table below, followed by the behavior script (corresponding to FIG. 4):

```
Page:
        <HEAD>
        <STYLE>
                LI {behavior:url (hilite.htc) }
        </STYLE>
        </HEAD>
        .
        .
        <BODY>
        <UL>
                <LI>Some item here</LI>
        </UL>
        </BODY>
```

```
Script in Behavior:
    <PUBLIC:ATTACH EVENT "onmouseover" ONEVENT="Hilite( )" />
    <PUBLIC:ATTACH EVENT="onmouseout" ONEVENT="Restore( )" />
    <SCRIPT LANGUAGE="JScript">
    var normalColor;
    function Hilite( )
    {
        if (event.srcElement == element)
        {
            normalColor = style.color;
            runtimeStyle.color = "red";
            runtimeStyle.cursor = "hand";
        }
    }
    function Restore( )
    {
        if (event.srcElement == element)
        {
            runtimeStyle.color = normalColor;
            runtimeStyle.cursor = "";
        }
    }
</SCRIPT>
```

As can be readily appreciated, the behavior component $60_4$ used in FIG. 4 to implement the mouseover highlight effect was implemented as an HTC, and involves just a few lines of code. As shown above and in FIG. 4, the code mainly comprises script, with a number of elements used to define the behavior. Note that the use of the ATTACH element allows an HTC to listen in on events fired on the element on the page and to handle the events appropriately, as generally described below. This provides a means to encapsulate event-handling code that would otherwise be put on the page.

Although HTC provides a quick and easy way to create DHTML behaviors using scripting languages such as Microsoft® Visual Basic® Scripting Edition (VBScript) and Microsoft® JScript® (compatible with ECMA 262 language specification), like other components used on the Internet today, behaviors can be alternatively implemented using Windows® Scripting Components (WSC) or C++. Note that when using the behavior attribute, the type of behavior, i.e., a behavior implemented as a binary component (using C++ or any compiled code), a default behavior (built into the renderer 66), or as a component written in script (either as an HTML Component or as a scriptlet) determines the syntax used to apply the behavior to an element using cascading style sheets. In the case of a Component Script and HTML implementation, the STYLE can specify a URL for the script that implements the component. In the case of a binary implementation of the component, the url in the style would refer to the ID of an OBJECT tag that declares a binary component to supply a factory for the component.

When different instances of a behavior component are attached, a style subobject of the element is used, as set forth in the following example:

```
<HEAD>
    <SCRIPT>
    function window. onload( )
    {
        L1.style.behavior = "url (hilite.htc)";
        L2.style.behavior = "url (hilite.htc)";
    }
    </SCRIPT>
    </HEAD>
<UL>
```

-continued

```
    <LI ID=L1>Some item such as text here</LI>
    <LI ID=L2>and some other item here</LI>
</UL>
```

Another way in which cascading style sheets may be used to implement a behavior on an element is by defining an embedded style, using a class name as a selector. Note that the selector begins with a period (.), which is the syntax for class names as selectors. This causes each element assigned the class name of HILITE to behave as defined in hilite.htc. An example using a class name is shown below:

```
<HEAD>
    <STYLE>
        .HILITE { behavior:url (hilite.htc) }
    </STYLE>
    </HEAD>
<UL>
    <LI CLASS="HILITE">Some item here</LI>
    <LI CLASS="HILITE">and another here</LI>
</UL>
```

As shown in FIG. 3, because the behavior is an instance of a separate file, the behavior component $60_2$ may be reused across multiple pages $68_A$, $68_B$ to achieve a similar effect throughout an entire web site. Moreover, note that instead of referencing the behavior in cascading style sheet block as in the preceding example, like other cascading style sheet attributes, the behavior may be applied as an inline style to the LI element, as shown in the following example:

```
<BODY>
<UL>
    <LI STYLE="behavior:url (hilite.htc)"> Some item here
</UL>
</BODY>
```

In general, the designer typically specifies the behavior attribute based on how many elements are to have the behavior applied. For example, defining the behavior inline or through script is appropriate for applying the behavior to a select number of elements, while defining an embedded style is appropriate for applying the behavior to a set of elements globally.

Another way in which a behavior may be applied to an element is via scripting, using the addBehavior method. The addBehavior method is a dynamic way of applying a behavior to an element. When the method is called, the behavior is appended to a list of behaviors being applied to the element (as opposed to overwriting the behavior that might have already been attached to that element at the time the method was called). Once attached, the behavior can be detached anytime using the removeBehavior method. The following example demonstrates how a behavior that implements a mouseover highlighting effect could be dynamically attached to each of the LI elements on a page using addBehavior. Subsequently, the behavior may be detached using removeBehavior in a similar manner.

```
<SCRIPT LANGUAGE="Jscript">
    var collBehaviorID = new Array( );
    var collLI = new Array ( );
    var countLI = 0;
    function attachBehavior ( )
    {
        collLI = document.all.tags ("LI");
        countLI = collLI.length;
        for (i=0; i < countLI; I++)
        {
            var iID = collLI[i].addBehavior ("hilite.htc");
            // if behavior has already been added to the element,
            // addBehavior returns 0.
            if (iID)
                collBehaviorID[i] = iID
        }
    }
</SCRIPT>
```

Note that a behavior attached to an element through cascading style sheets, using a style rule defined in the document, is automatically detached from the element as soon as the element is removed from the document tree. Once the element is removed, all associations of that element to any element in the document tree, such as style sheet rules that specify behaviors, are stripped from the element as well. Conversely, a behavior attached to an element through an inline style, or through the addBehavior method, is not automatically detached from the element when the element is removed from the document hierarchy. These two methods of applying behaviors have no dependencies on the containing document, and therefore the behavior remains applied to the element even as it is removed from the document tree. The removeBehavior method can be invoked to explicitly detach this type of behavior from the element.

Multiple behaviors can be applied to an element, for example by specifying a space-delimited list of URLs for the behavior attribute, as shown in the following code. This particular sample demonstrates how two behaviors can be applied to an element to achieve a combination of effects:

```
<UL>
    <LI STYLE="behavior:url(collapsing.htc)
url(hilite.htc)">HTML</LI>
```

```
<UL>
    <LI> Some item here changes color and
collapses</LI>
        :
    </UL>
</UL>
```

Note that the addBehavior method can also be called to apply additional behaviors to an element.

When applying multiple behaviors to an element, conflicts may occur, for example if both behaviors operate to change an element's color. Conflicts are resolved based on the order in which the behavior was applied to the element. Using the above example, the "collapsing.htc" behavior is applied first, followed by the "hilite.htc" behavior, with each subsequent behavior taking precedence over the previous behavior. In the above example, if there are no conflicting style assignments between the two behaviors, any style changes made by both behaviors are applied unaltered to the element. If, however, both behaviors set the element's color, for example, the second (hilite.htc) behavior's color prevails because it was applied to the element later than the first behavior (collapse.htc). The same rule applies when resolving name conflicts, such as with property, method, or event names exposed by multiple behaviors.

The behavior property of an element can be overridden when multiple styles are applied to an element, (similar, for example, to the overriding of the color property). When resolving style conflicts in an HTML document, the cascading style sheet rules of cascading and inheritance prevail, wherein the order of specificity, from greatest to least, is (1) inline styles; (2) ID; (3) CLASS; and (4) HTML element. In the following example, both the "Collapsing" class and the inline style for the LI element define the behavior attribute.

```
<STYLE>
    UL      {   font-family: verdana, arial, helvetica, sans-serif;
font-size: 10}
    .Collapsing    {behavior:url(collapsing.htc)    }
</STYLE>
    :
<UL>
    <LI CLASS="Collapsing"
STYLE="behavior:url(hilite.htc)">HTML Authoring</LI>
    :
>
```

Applying the precedence rules to the example, the inline style that applies the highlighting behavior to the element prevails over the "Collapsing" class, so that only the highlighting effect gets applied to the LI, and the expanding/collapsing effect does not get applied. In this situation, the inline style takes precedence over the rule with CLASS as the selector.

As a component, a DHTML behavior may expose properties, methods, and events that define its object model. When a behavior is applied to an element, the element's properties, methods, and events are extended to include those exposed by the behavior.

Turning to an explanation of the present invention from the perspective of the renderer 66, the renderer 66 operates in response to an event to interpret the appropriate page elements. In keeping with the present invention, when an element in the HTML document having a behavior component attached is parsed by the renderer 66, instead of having to run a script, the renderer 66 instantiates (or uses if already instantiated) the behavior component to perform some action. Instantiation of behavior component may require downloading, and, if a download is required, the component may be downloaded and instantiated on a separate thread whereby the parsing of the main document is not halted.

Figure 5:
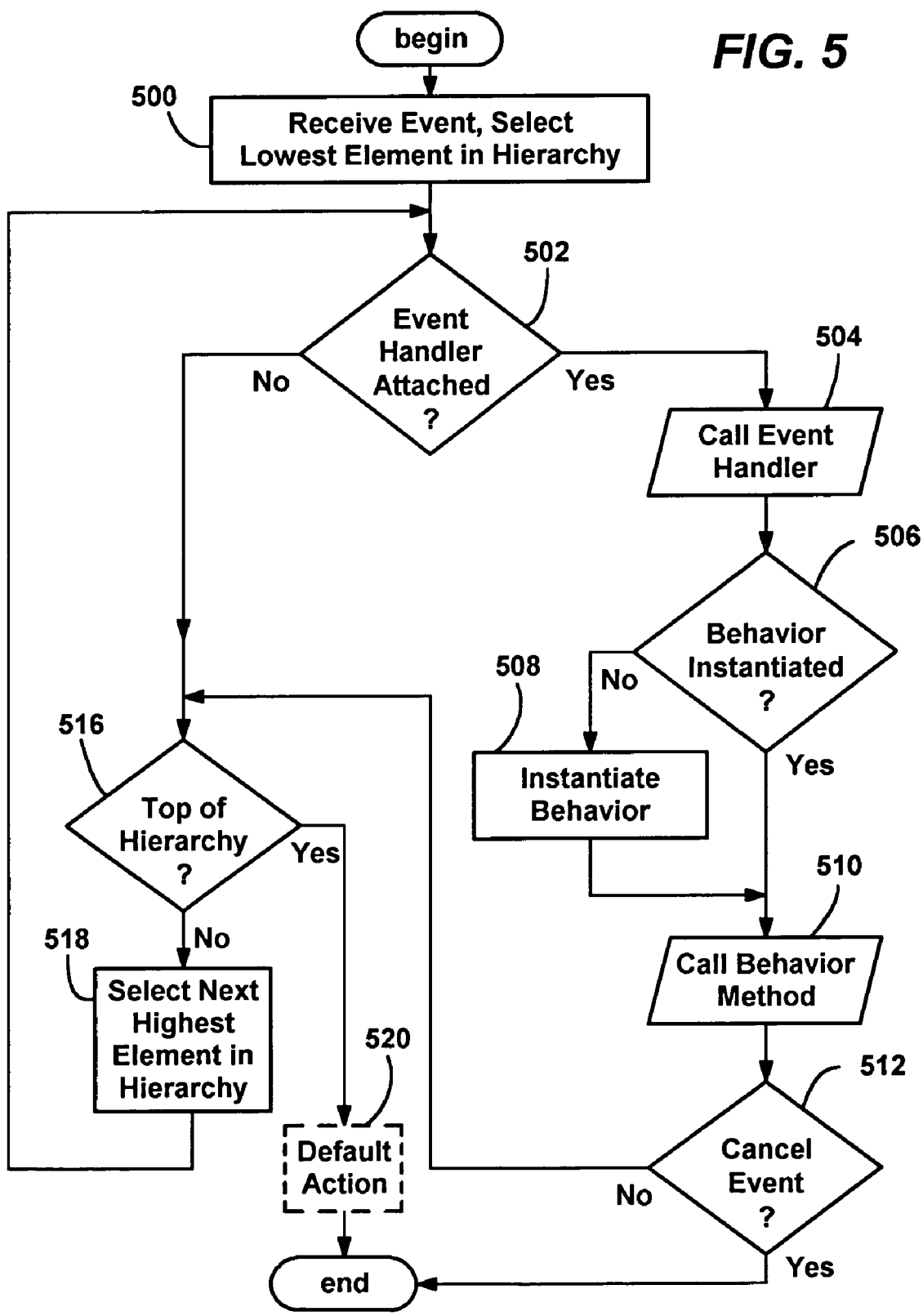
FIG. 5 is a flow diagram generally representing steps taken when an event is received to render a page or apply a behavior to one or more elements of a rendered page in accordance with one aspect of the present invention.

As generally described below, when an event is received, (e.g., from some event detector 72, FIG. 3) the renderer 66 knows to which element the event applies, and takes appropriate action based on that event. Events fired by behaviors are handled the same way as standard DHTML events, and are thus only generally described herein for purposes of simplicity. First, the user action or condition associated with the event occurs. An event object is updated to reflect the conditions of the event, and the event fires, i.e., a notification is provided in response to the event. FIG. 5 generally represents the actions taken when an event notification is received. At step 500, the lowest element in the hierarchy is selected, and tested for whether it has an associated event handler for this particular event. As generally described above, the ATTACH element may be used to associate an event handler 74 (FIG. 3) to a specific event and specific element or object in order for the handler to be called when the event fires. Other ways of attaching event handlers to DHTML elements are well known to those skilled in the art and are not described herein.

If no event handler is attached, the event bubbles up through the hierarchy of elements until the top of the hierarchy has been reached, (i.e., until the event bubbles up to the window object), as represented by steps 516-518. If an event handler 74 is attached to the current element, such as to handle mouseover events, at step 504 the event handler 74 is called to carry out its actions and return. For example, as represented via steps 506-508, the event handler 74 may determine if a behavior component needs to be instantiated (step 508), and if so, instantiates the behavior (step 508). Then, the event handler 74 (or renderer) calls a method of that behavior (step 510) on an interface 76, passing it any needed information (e.g., the rendered element's coordinates) to carry out its actions to affect the element's appearance or behavior, (e.g., to change the rendered element's color). Note that some or all of the event handler functions described herein may be performed by the renderer 66, e.g., instantiating the behavior as needed, and calling a method thereof, while other event handler operations may be written into the behavior component. A dashed box is used to represent the event handler 74 in FIG. 3 because its functionality can be thus performed by other components.

An event handler can cancel the bubbling of an event, as represented by step 512, wherein the event is considered fully handled. Otherwise the event handling process branches to step 516, where the event bubbles up through the hierarchical tree of elements via steps 516 and 518. A final default action (optional at step 520, shown as a dashed box) may be taken if the event not canceled by a handler at step 512.

Basic interfaces for calling an instantiated behavior component are set forth below, along with accompanying information:

| | |
|---|---|
| IElementBehavior | Receives notifications from MSHTML.dll concerning the activities of DHTML behaviors. |
| IElementBehaviorCategory | Provides DHTML behaviors a means of identifying their category. |
| IElementBehaviorFactory | Provides DHTML behavior implementation to the MSHTML component of Internet Explorer 5. |

-continued

| | |
|---|---|
| IElementBehaviorRender | Enables a behavior component to participate in the rendering of text and objects. |
| IelementBehaviorSiteCategory | Provides DHTML behaviors a means of identifying other related behaviors by category. |
| IElementBehaviorSite | Provides communication between MSHTML and component. |
| IElementBehaviorSiteOM | Provides event services to behavior components. |

The IElementBehavior interface is an event sink that receives notifications from Mshtml.dll concerning the activities of Dynamic HTML (DHTML) behaviors. This interface is obtained from the IElementBehaviorFactory::FindBehavior method, described below.

| IElementBehavior Methods: | |
|---|---|
| Detach | Called before the document unloads its contents. |
| Init | Called with the IElementBehaviorSite interface after the IElementBehavior interface is obtained from the IelementBehaviorFactory::FindBehavior method. |
| Notify | Called with information about the parsing of the document and the behavior component. |

IElementBehavior is the basic interface to be implemented by a DHTML Behavior component. Init( ) is called on the Behavior when it is instantiated, and is used to pass the IElementBehaviorSite to the Behavior component. The behavior component may cache this pointer for later use, and the pointer is passed to the behavior component without the interface addressed. Notify( ) is a generic mechanism to send down arbitrary notifications to the component. Notifications that are currently sent include BEHAVIOREVENT_CONTENTREADY, fired once when the content of the element has been initially parsed (not every time the content changes). The other notification is the BEHAVIOREVENT_DOCUMENTREADY notification, which is sent when the contents of the document have been parsed. This is equivalent to the onload event or readystate which is fired when the entire document, including images, OBJECTS, SCRIPTS, and so forth have also downloaded. The DOCUMENTREADY notification is sent after the document has finished parsing.

The IElementBehaviorCategory interface provides DHTML behaviors a means of identifying their category. Using identification by category, related behaviors may be easily located.

| IElementBehaviorCategory Methods: | |
|---|---|
| GetCategory | Retrieves the category of this behavior as a string. |

The IElementBehaviorFactory interface provides DHTML behavior implementations.

| IElementBehaviorFactory Methods: | |
|---|---|
| FindBehavior | Instantiates the IElementBehavior interface. |

The IElementBehaviorRender Interface enables a behavior component to participate in the rendering of text and objects. If the behavior component does not need to participate in such rendering, this interface need not be implemented.

| IElementBehaviorRender Methods: | |
|---|---|
| Draw | Called whenever MSHTML needs to render the component. |
| GetRenderInfo | Provides data to MSHTML for rendering the behavior component. |
| HitTestPoint | Retrieves if a specified point is hit by your application. |

The IElementBehaviorSiteCategory interface provides DHTML behaviors a means of identifying other related behaviors by category. Using identification by category, related behaviors may be easily located.

| IElementBehaviorSiteCategory Methods: | |
|---|---|
| GetRelatedBehaviors | Retrieves a list of all related behaviors that share the same category. |

The IElementBehaviorSite interface is the fundamental means of communication that a component has with MSHTML.dll. This interface is first received by the IElementBehavior::Init notification. The IElementBehaviorSiteOM, IBindHost and IServiceProvider interfaces can be accessed through the IElementBehaviorSite interface by using QueryInterface.

| IElementBehaviorSite Methods: | |
|---|---|
| GetElement | Retrieves the element to which a component is bound |

The IElementBehaviorSiteOM interface is responsible for providing event services to behavior components. To access this interface, use QueryInterface on the IElementBehaviorSite interface returned by the IElementBehavior::Init notification method.

| IElementBehaviorSiteOM Methods: | |
|---|---|
| CreateEventObject | Instantiates a new event object for use in firing an event. |
| FireEvent | Fires a behavior component event. |
| GetEventCookie | Retrieves the behavior-ID (handle) that identifies the component to MSHTML.dll. |
| RegisterEvent | Registers a behavior event with MSHTML.dll. |
| RegisterName | Registers a behavior event with MSHTML.dll. |
| RegisterUrn | Registers a behavior event with MSHTML.dll. |

In keeping with the present invention, behaviors can extend an existing HTML element by adding functionality via an Object Model. An example is the mask edit behavior, wherein behavior is applied to input elements that allow data entry. The mask behavior provides a combination of restricted input and formatted output. For example, a mask behavior component can be applied through one of several preset formats to many common types of forms fields, such as date, time, and phone number fields, whereby the user may only enter appropriate data (e.g., numbers) in appropriate fields. To this end, when information is entered, the behavior may provide visual cues about the type of acceptable information (e.g., a slash "/" between numeric mm/dd/yy date entries) and/or feedback about incorrect entries. A sample htc (HTML Component) file that provides entry fields for date, money and time entries via mask behavior is set forth below:

```
<property name= maskType />
<script language="jscript">
var realValue;
var formattedValue;
doBlur( );
attachEvent("onfocus", doFocus);
attachEvent("onblur", doBlur);
function doFocus( ) {
   value=realValue;
}
function formatMoney(aValue) {
   var theFloat = parseFloat(aValue);
   var theMoney = (Math.round(theFloat * 100)) / 100;
   var theMoneyString = "$"+theMoney;
   return theMoneyString;
}
function formatDate(aValue) {
   var theMS = Date.parse(aValue);
   var theDate = new Date(theMS);
   return theDate.toLocaleString( ).slice(0,10);
}
function formatTime(aValue) {
   var theMS = Date.parse("1/1/80 "+aValue);
   var theDate = new Date(theMS);
   return theDate.toLocaleString( ).slice(10,23);
}
function format(aValue) {
   if (aValue == "") {
      return "";
   }
   if (maskType == "money") {
      return formatMoney(aValue);
   }
   if (maskType == "date") {
      return formatDate(aValue);
   }
   if (maskType == "time") {
      return formatTime (aValue);
   }
}
function doBlur( ) {
   realValue = value;
   value=format (value);
}
</script>
```

In accordance with another aspect of the present invention, new tags may be used for applying behaviors to elements instead of existing tags. For example, a CIRCLE or SQUARE tag may be used for vector graphics. New tags are parsed and the document tree built as though it were a standard container tag with clearly defined parsing rules for a containing tag.

To this end, behavior components define functionality for new tags that follow an XML namespace syntax, and thus new tags are declared using a declaration on the HTML tag, for example:

```
<HTML xmlns:vg=" http://www.mysite.com/vg" >
```

This declares the XML namespace of VG for use within the document. The style sheet to declare behaviors and styles for the custom tags can use a linked style sheet, but the form is as follows:

```
<STYLE>
@media all{
VG\:CIRCLE{
behavior:url(http://mysite/mytag.circle.htc)
;}
VG\:SQUARE{
behavior:url(http://mysite/mytag.square.htc)
;}
}
</STYLE>
```

The tags would be used in the document as follows:

```
<VG:CIRCLE width=100 height=100 center=150>
<VG:SQUARE width=50 height=50>
some text in the <B>square</B> that can be rendered by
the renderer or the Tag
</VG:SQUARE>
</VG:CIRCLE>
```

The new tags that follow XML syntax would be able to have virtually any HTML within them. If any ill-formed, overlapping, or implied HTML tags are present, the renderer 66 will build the document tree to the best of its ability and render the page image accordingly. Note that use of @media all to contain the custom tag declarations is optional, which allows a downlevel browser to ignore the content, (as some browsers dislike the use of the backslash within cascading style sheets, although permitted).

In accordance with another aspect of the present invention, behaviors may be used to render complex drawings. As described above, an extensible tag can use the renderer 66 to handle rendering of its data simply by placing the relevant content in the document tree, whereby the renderer 66's rendering abilities do the rest. However there are definite aspects of rendering that the renderer 66 cannot achieve, such as circles, curves and line drawing.

To allow an extensible tag component to extend the browser's abilities in this area, a new drawing interface is established which the behavior component implements, and the renderer 66 calls at appropriate times during its rendering. When called, the drawing behavior component is passed a drawing surface that is windowless, such that any drawing can fit into a specified z-index and be subject to any filter and transition effects.

The renderer 66 draws in four passes, namely, 1) Background, the background of the document; 2) Negative-Z, any Z-index layers below the current element of interest; 3) Content—the content of the current element; and 4) Positive-Z, any Z-Index layers that are above the element.

Figure 6:
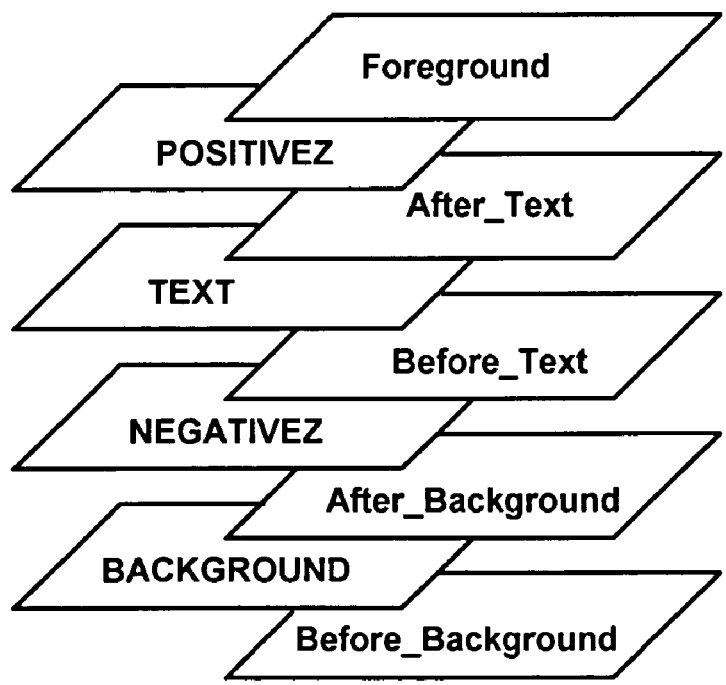
FIG. 6 is a representation of how an external behavior component may interleave complex drawings with the drawing of a renderer in accordance with another aspect of the present invention.

The extensible tag behavior component may prevent the renderer 66 from drawing any of the above four rendering layers, and also may provide drawing at any five additional layers that interleave renderer's layers. As represented in FIG. 6, these five layers are 1) Before Background, before the renderer 66 even draws the background of the document; 2) After Background, between the renderer's Background and Negative-Z layers; 3) Before Content, between the renderer's Negative-Z and Content layers; 4) After Content, between the renderers Content and Positive-Z layers; and 5) After Foreground, after the renderer's Positive-Z layer. The interface is set forth below:

```
IHTMLElementPeerRender

Interface IHTMLElementPeerRender
{
    HRESULT Draw(DWORD dwLayer, HDC hdc,
IpropertyBag2 *pPB2);
    HRESULT GetRenderInfo (RENDERINFO *prenderinfo);
};
Struct RENDERINFO
{
    DWORD cbSize;
    DWORD dwLayerMask;
    DWORD dwDrawMask;
};
#define DRAWLAYER_BEFORE_BACKGROUND    0x001
#define DRAWLAYER_BACKGROUND           0x002
#define DRAWLAYER_AFTER_BACKGROUND     0x004
#define DRAWLAYER_NEGATIVEZ
```

This interface is implemented by any component which wants to participate in the rendering of text and objects.

As can be seen from the foregoing detailed description, there is provided a method and system wherein dynamic functionality is encapsulated in a tag or class, and the behavior component is external to the page, providing clean, robust, powerful and extensible dynamic functionality to web page elements that may be reused across multiple pages. A simple declarative syntax greatly simplifies applying a behavior to an element.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-readable medium having computer-executable instructions for performing a method of rendering a web page image, the method comprising:

receiving an HTML document having an element thereon, the HTML document including information associating the element with an external component that is encapsulated and external to the HTML document such that multiple instances of the external component are used with a plurality of different HTML documents including the HTML document having the element thereon and wherein the information associating the element with the external component is maintained in a cascading style sheet;

rendering a page image corresponding to at least part of the HTML document, the page image including a representation of the element and the page image being rendered by a renderer configured to:

modify the page image by accessing one or more extensible markup language (XML) namespaces specified by the external component to initiate drawing of information on the page image based at least in part on code included in the one or more XML namespaces;

make a plurality of calls to the one or more XML namespaces to initiate the drawing of the information on the page image; and draw the information on the page image responsive to one or more of the plurality of calls to the one or more XML namespaces;

instantiating the external component to reveal one or more of the XML namespaces specified by the external component, the one or more of the XML namespaces being external to the HTML document and specifying one or more behaviors to be applied to the element; and accessing the one or more XML namespaces to retrieve a new behavior to be applied to the representation of the element rendered on the page image, the new behavior being configured to enhance a default behavior for the element.

2. The computer-readable medium of claim 1 further comprising, receiving an event, and wherein instantiating the external component is in response to receiving the event.

3. The computer-readable medium of claim 1 further comprising, modifying an appearance of the representation of the element in response to accessing the one or more of the XML namespaces.

4. The computer-readable medium of claim 1 further comprising, changing a location of the representation of the element in response to accessing the one or more of the XML namespaces.

5. The computer-readable medium of claim 1 further comprising, drawing information on the page image in response to accessing the one or more of the XML namespaces.

6. The computer-readable medium of claim 1 wherein the external component comprises an object, and wherein accessing the external component includes instantiating an instance of the object.

7. The computer-readable medium of claim 1 further comprising, receiving a new HTML document having another element thereon, the new HTML document including information associating the another element with the external component, rendering a new page image corresponding to at least part of the HTML document, the new page image including a representation of the another element, and accessing the one or more of the XML namespaces for determining a behavior of the representation of the another element rendered on the new page image.

8. The computer-readable medium of claim 7 wherein the external component comprises a component object model (COM) object, and wherein instantiating the external component for determining a behavior of the representation of the another element includes instantiating another instance of the object.

9. The computer-readable medium of claim 1 wherein the information associating the element with the external component is maintained in a custom tag.

10. The computer-readable medium of claim 1 wherein the information associating the element with the external component is maintained in a class.

11. The computer-readable medium of claim 1 wherein the information associating the element with the external component is maintained in the document inline with the element.

12. The computer-readable medium of claim 1 wherein the HTML document includes another element having a representation thereof rendered in the page image, the HTML document includes other information associating the another element with the external component, and further comprising, accessing the external component for determining a behavior of the representation of the another element.

13. The computer-readable medium of claim 1 wherein the HTML document includes information associating the element with a second external component, and further comprising, accessing the second external component for determining a second behavior of the representation of the element.

14. The computer-readable medium of claim 13 further comprising, resolving a conflict between the behavior determined by the one or more XML namespaces and the second behavior determined by the second external component based on the order in which the behaviors were applied to the element with each subsequent behavior taking precedence over a previous behavior.

15. The computer-readable medium of claim 1 further comprising, downloading the external component.

16. A computer-implemented method of providing dynamic effects to an HTML document, comprising, encapsulating code in an external component that affects a behavior of one or more elements contained in the HTML document while being external to the HTML document, including elements of different HTML documents, wherein code for determining a behavior of the one more elements contained in the HTML document is not included in the HTML document and is defined by one or more extensible markup language (XML) namespaces associated with the external component;

inserting an element into the HTML document;

attaching a reference in the HTML document to associate the element with an instance of the external component, such that another instance of the element is referenced by a different HTML document, and wherein the reference associating the element with the external component is maintained in a cascading style sheet and comprises a reference to the one or more XML namespaces; and providing the HTML document to a renderer, wherein the renderer is capable of instantiating the external component, the renderer being configured to:

modify a page image by accessing the one or more XML namespaces associated with the external component to initiate drawing of information on the page image based at least in part on code included in the one or more XML namespaces;

make a plurality of calls to the one or more XML namespaces to initiate the drawing of the information on the page image;

draw the information on the page image responsive to one or more of the plurality of calls to the one or more XML namespaces;

instantiate the external component to reveal one or more of the XML namespaces associated with the external component the one or more of the XML namespaces being external to the HTML document and specifying one or more behaviors to be applied to the element; and access the one or more XML namespaces to retrieve a new behavior to be applied to a representation of the element rendered on the page image the new behavior being configured to enhance a default behavior for the element.

17. The method of claim 16 further comprising, providing the external component to the renderer.

18. The method of claim 16 further comprising, rendering the page image from the HTML document, accessing the one or more XML namespaces, and modifying the representation of the element based on the code in the one or more XML namespaces.

19. The method of claim 18 wherein the external component is a component object model (COM) object, and wherein accessing the one or more XML namespaces includes calling an interface of the COM object.

20. The method of claim 18 wherein modifying the representation of the element includes changing the appearance thereof.

21. The method of claim 18 wherein modifying the representation of the element includes changing the location thereof.

22. The method of claim 16 further comprising, rendering the page image from the HTML document, accessing the one or more XML namespaces, and drawing information in the page image based on the code in the one or more XML namespaces.

23. The method of claim 22 wherein rendering the page image from the HTML document is interleaved with drawing information in the page image.

24. The method of claim 16 further comprising receiving an event indicative of user interaction with the page image.

25. The method of claim 16 wherein the reference associating the element with the external component is maintained in a custom tag.

26. The method of claim 16 wherein the reference associating the element with the external component is maintained in a class identifier.

27. The method of claim 16 wherein the reference associating the element with the external component is maintained inline with the element in the HTML document.

28. A computer system including at least one processor for rendering page images on a display, comprising:
an external component encapsulating code for modifying a behavior of one or more elements, the external component operable to be instantiated multiple times and operable to modify elements in a plurality of different HTML documents while being external to the HTML documents and wherein information associating the one or more elements with the external component is maintained in a cascading style sheet, wherein code for determining a behavior of the one or more elements is included in one or more extensible markup language (XML) namespaces that are defined externally to the HTML documents and that are associated with the external component; and
at least one processing unit comprising a renderer connected to the display for rendering the page images, the renderer being configured to:
modify one or more of the page images by accessing one or more of the XML namespaces associated with the external component to initiate drawing of information on the one or more of the page images based at least in part on code included in the one or more XML namespaces;
make a plurality of calls to the one or more XML namespaces to initiate the drawing of the information on the one or more of the page images; and
draw the information on the one or more of the page image responsive to one or more of the plurality of calls to the one or more XML namespaces;
the renderer being further configured to:
instantiate the external component to reveal one or more of the XML namespaces associated with the external component the one or more of the XML namespaces being external to the HTML document and specifying one or more behaviors to be applied to the one or more elements; and
access the one or more XML namespaces to retrieve a new behavior to be applied to the representation of the one or more elements rendered on the page image, the new behavior being configured to enhance a default behavior for the one or more elements.

29. The system of claim 28 further comprising a mechanism for receiving an event.

30. The system of claim 28 wherein the renderer is configured to display a representation of the one or more elements and modify a behavior of the element by accessing the one or more XML namespaces.

31. The system of claim 30 wherein the behavior is modified by changing a displayed property of the representation of the one or more elements.

32. The system of claim 30 wherein the behavior is modified by changing a displayed location of the representation of the one or more elements.

33. The system of claim 28 wherein the renderer is configured to call the external component a plurality of times to draw information on the one or more of the page images, and the renderer is configured to draw information on the one or more of the page images between at least some of calls to the external component.

34. The system of claim 28 wherein the external component comprises an object, and wherein the renderer is configured to instantiate an instance of the object.

35. The system of claim 28 wherein the external component comprises an object, and wherein the renderer is configured to communicate with the object through an interface.

36. The system of claim 28 wherein the renderer is configured to receive a new HTML document having another element thereon that references the external component.

37. The system of claim 28 wherein the cascading style sheet is embedded in the HTML document.

38. The system of claim 28 wherein the cascading style sheet is linked to the HTML document.

39. The system of claim 28 including a custom tag for associating the one or more elements with the external component.

40. The system of claim 28 wherein the information associating the one or more elements with the external component is maintained in the HTML document inline with the one or more elements.

41. The system of claim 28 wherein the HTML document includes another element and information associating the another element with the external component, and wherein the renderer is configured to access the one or more XML namespaces for determining a behavior of a representation of the another element.

42. The system of claim 28 wherein the HTML document includes information associating the one or more elements with a second external component.

43. The system of claim 28 wherein the renderer is configured to access the external component to control a format of data input by a user.

* * * * *